United States Patent [19]
Muthukrishnan et al.

[11] Patent Number: 6,065,007
[45] Date of Patent: May 16, 2000

[54] COMPUTER METHOD, APPARATUS AND PROGRAMMED MEDIUM FOR APPROXIMATING LARGE DATABASES AND IMPROVING SEARCH EFFICIENCY

[75] Inventors: Shanmugavelayut Muthukrishnan, New York, N.Y.; Viswanath Poosala, Highland Park; Torsten Suel, Springfield, both of N.J.

[73] Assignee: Lucent Technologies Inc., Murray Hill, N.J.

[21] Appl. No.: 09/071,149

[22] Filed: Apr. 28, 1998

[51] Int. Cl.$^7$ .................................................. B06F 17/00
[52] U.S. Cl. .............................. 707/7; 707/501; 707/101; 382/168
[58] Field of Search ................ 707/1–540; 382/103–232

[56] References Cited

U.S. PATENT DOCUMENTS

| | | | |
|---|---|---|---|
| 5,862,260 | 1/1999 | Rhoads | 382/232 |
| 5,920,641 | 7/1999 | Ueberreiter et al. | 382/125 |
| 5,926,568 | 7/1999 | Chaney et al. | 382/128 |
| 5,960,097 | 9/1999 | Pfeiffer et al. | 382/103 |
| 5,987,170 | 11/1999 | Yamamoto et al. | 382/170 |

*Primary Examiner*—Thomas G. Black
*Assistant Examiner*—David Jung

[57] ABSTRACT

A novel and unique method, apparatus and programmed storage medium for approximating large data distributions of a database in order to allow a user to accurately analyze the entire data distribution using a limited amount of memory space in a reasonable amount of time. The approximation is based on partitioning the data domain into a number of regions, approximating each region using any well-known technique, and composing the errors of approximation to optimize suitable criteria for approximating the entire data distribution.

54 Claims, 5 Drawing Sheets

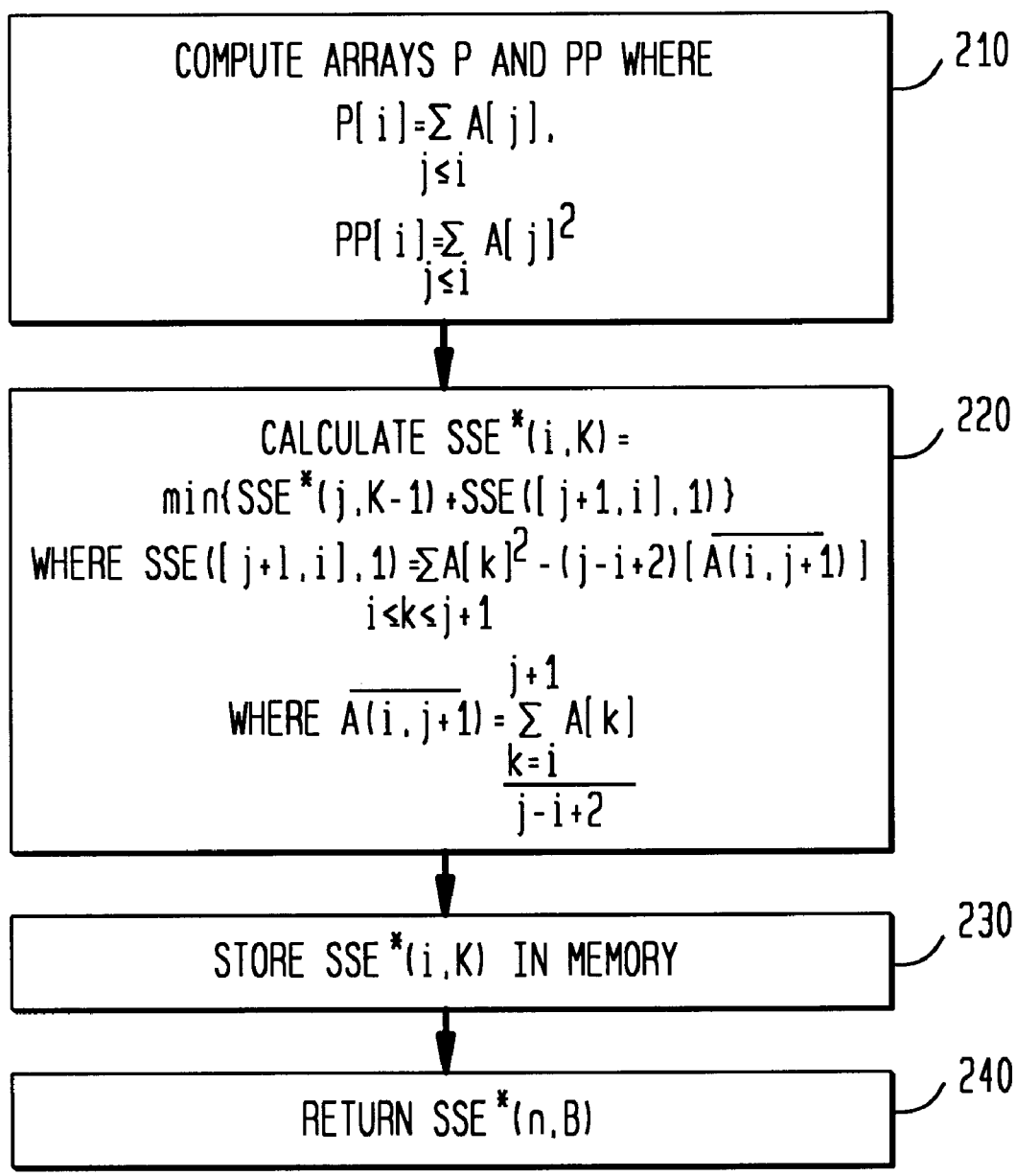

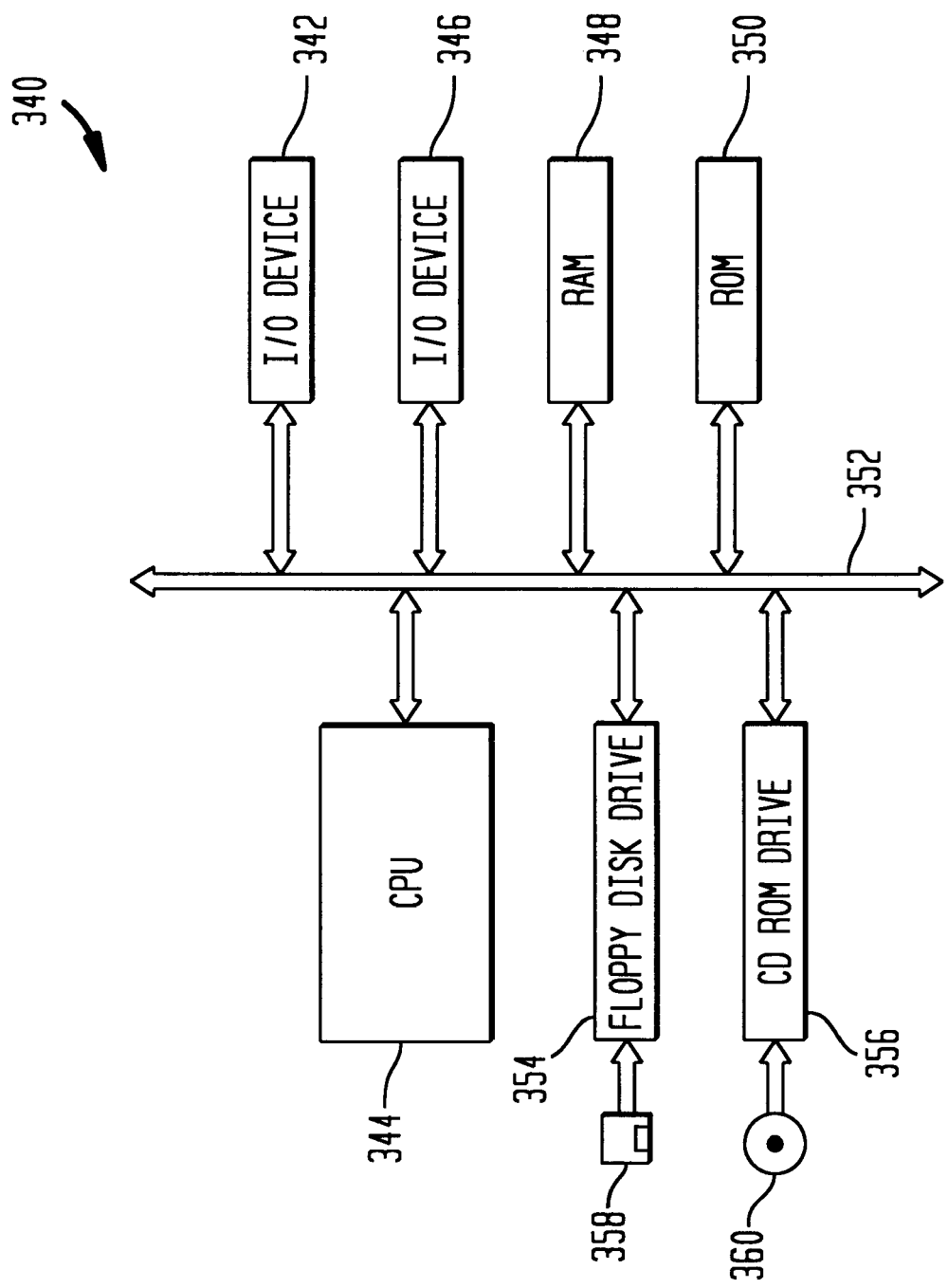

COMPUTER METHOD, APPARATUS AND PROGRAMMED MEDIUM FOR APPROXIMATING LARGE DATABASES AND IMPROVING SEARCH EFFICIENCY

FIELD OF THE INVENTION

The present invention relates in general to a computer method, apparatus, and programmed medium for approximating low-dimensional data distributions in a database for the purpose of reducing the time and memory space necessary for performing user initiated operations and analysis on the database. In particular a large data distribution of a database is approximated by partitioning the data domain into a number of regions, and approximating each region using any well-known technique, e.g. histograms or polynomials. This approximation reduces the amount of memory space and time necessary to store and analyze the data distribution in response to user inquiries.

BACKGROUND OF THE INVENTION

Since their invention, computers have been used to store extensive amounts of data in large databases. A database is defined as a collection of items, organized according to a data model and accessed via queries. For example, consider a computer database, also called a data warehouse, which comprises vast historical data, such as all sales transactions over the history of a large department store. For the purpose of decision making, such as determining whether or not to continue selling a particular item, users are often interested in analyzing the data by identifying trends in the data rather than individual records in isolation. This process usually involves posing records in isolation. This process usually involves posing complex aggregate user queries to large amounts of data in a database. In this case, it is often desirable for a user to access small statistical summaries of the data for the purpose of solving aggregate queries approximately, as this is significantly more efficient than accessing the entire historical data.

In addition, the complexity of user queries in these applications is often much higher than in traditional database applications, making it even more important to provide highly accurate selectivity estimates in order to generate inexpensive query execution plans.

A fundamental problem arising in many areas of database implementation is the efficient and accurate approximation of large data distributions using a limited amount of memory space within a reasonable amount of time. Traditionally, histograms have been used to approximate database contents for selectivity estimation in query optimizers.

A histogram approximates the data distribution of an attribute by grouping values into subsets, known as buckets, and using the summary statistics of the values in the buckets. They are the most commonly used form of statistics in practice in commercially available database systems because they incur almost no run-time overhead, and they are effective given even a small memory budget.

There has been extensive work on histograms for one-dimensional data. The traditional histograms are equi-width and equi-depth. More recently proposed one-dimensional histograms such as V-Optimal, MaxDiff, Compressed and Spline-based are more accurate; their taxonomy and optimality for estimating various query operators are reasonably well understood. See Viswanath Poosala, "Histogram-based Estimation Techniques in Databases," Ph.D. Thesis, University of Wisconsin-Madison, 1997. While equi-width, equi-depth, MaxDiff and Compressed histograms are easy to compute, efficient computation of the V-Optimal or the Spline-based histograms have not yet been developed. These are important classes of histograms since they are well suited for estimating result sizes of queries such as equality joins, selection, and range queries.

Approximating arbitrary, large data distributions by a small amount of "summary data", such that this summary data can then be used with no (or limited) further access to the entire distribution creates problems in data processing, since some accuracy will usually be lost in the approximation process. However, the smaller summary data can now be manipulated more efficiently in terms of processing time and memory space. A number of traditional and emerging applications, as defined below, rely on such approximations.

One such application, which relies on approximating arbitrary, large data distributions by a small amount of summary data, is known as Selectivity Estimation for Query Optimization. Commercial Database Management Systems (DBMSs) rely on selectivity estimation, that is, estimates of the result size of individual operators, in order to choose the most appropriate query execution plan for complex queries. This calls for very fast and reasonably accurate estimation techniques. The most common solution is to use histograms, which approximate the data distribution with a limited number of buckets as previously described.

Another application which relies on approximating arbitrary, large data distributions by a small amount of summary data is known as Providing Security by Summarizing Data. Data distributions may be approximated for preserving privacy. The idea is to summarize the distribution over subsets of domain values and make only the summary information publicly available for statistical analysis. This is commonly practiced in disseminating Census Data.

The need to approximate data distribution using limited summary data also arises in other application areas such as in Statistics, Data Compression, etc. Within the database community, a number of general approaches to the problem of approximating arbitrary, large data distributions by a small amount of summary data such that the summary data can then be used with no or little further access to the entire distribution have been developed and explored, mainly for selectivity estimation purposes. These include techniques that rely on precomputing information such as histograms, parametized mathematical distributions such as Zipf, and techniques that collect information at run-time, such as random sampling. These fundamentally different techniques perform satisfactorily under different favorable settings. For example, histograms are known to perform best for data with uniform value domains, frequencies that are skewed very high or very low, or with independencies among the attributes. Parametric techniques perform best when the underlying data closely follows a known mathematical distribution such as Zipf, multifractals, or bounded degree polynomials.

However, in general, data almost never satisfies such favorable assumptions in its entirety, although parts of it may well do so. Furthermore, depending on the particular query operator in selectivity estimation, many different measures of the error in approximating the data distribution may need to be optimized. In the absence of an elaborate understanding of the algorithms needed to solve such complex optimization problems, many known solutions for these techniques are based on heuristics. In general, they are either highly inaccurate or inefficient for approximating arbitrary data distribution for a variety of applications. Thus, the problem of approximating the data distribution of a database using a limited amount of memory space in a reasonable amount of time still remains.

The present invention has been designed to overcome some of the problems associated with the approximation of a large data distribution of a database to allow a user to analyze the large data distribution utilizing a smaller and more manageable, in both memory space and time considerations, approximation of the large data distribution.

SUMMARY OF THE INVENTION

The present invention advantageously provides a computer method, apparatus and programmed medium for approximating a large data distribution of a database utilizing a limited amount of memory space in a reasonable amount of time. The approximation of the large database results in an accurate summary of the contents of the large data distribution that can be used quickly and effectively by users who wish to analyze the contents of the database for decision making purposes, such as identifying trends, etc.

The invention achieves the above and other features and advantages by providing a database query system in which the data distribution is partitioned into a plurality of regions, each of which can be approximated using any of the known techniques. The errors in the regions created by approximating the distribution can be composed using any norm. This gives formal optimization criteria that quantify the error in approximating any distribution. Thus, the invention provides unified, systematic treatment of different techniques for approximation in a manner quantifiable by the total error.

The partitioning approach of the present invention requires finding efficient partitioning schemes. In general, with no restrictions on the partitions, the complexity of finding them depends inherently on the optimization criteria that are employed. An efficient method for approximating any data distribution under the framework of the invention is provided. For any given budget of memory space as determined by the requirements of the user, the method can provably optimize a variety of criteria independent of the technique used to approximate the region. Furthermore, the method has guaranteed (polynomial) bounds on time and memory space usage, and is particularly efficient for low-dimensional data.

The method may be applied to a variety of settings within the database field. To do so, one may choose a method to approximate the regions (e.g., polynomial interpolation) and a measure of the error (e.g., "the sum of the absolute errors at individual points") and a norm to compose these errors (e.g., "the Sum" or "the max" of the errors in the regions). For a given data distribution, the best way to partition the domain into regions, each of which is interpolated with a polynomial, such that the total error in approximating the entire distribution is minimized, can be found.

The above and other advantages and features of the invention will become more readily apparent from the following detailed description of the invention which is provided in connection with the accompanying drawings.

BRIEF DESCRIPTION OF THE DRAWINGS

FIG. 6 illustrates the steps for constructing a V-Optimal histogram utilizing the method of the present invention; and FIG. 7 illustrates in block diagram form a typical computer system in which the inventive method may be practiced.

DETAILED DESCRIPTION OF THE PREFERRED EMBODIMENT

Figure 1:
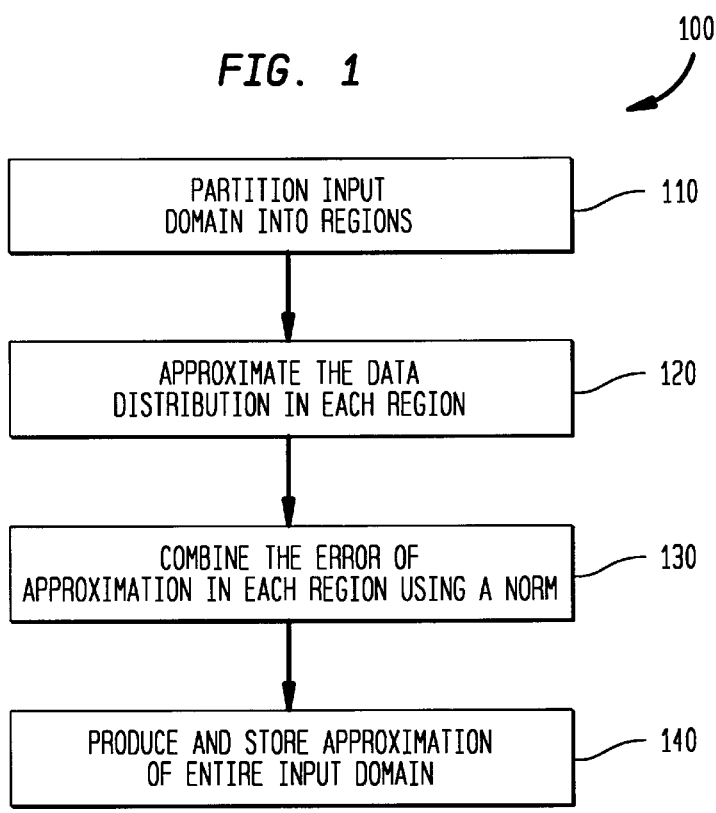
FIG. 1 is a block diagram illustrating the overall process of the present invention.

The general process 100 for approximating low-dimensional data according to the present invention is illustrated generally in FIG. 1.

Consider again a large data warehouse comprising vast historical data, such as all transactions over the history of a large department store. For the purposes of decision making, a user is often interested in identifying trends in the data rather than each individual record in isolation. In this case, the user will want to access small statistical summaries of the data for the purpose of solving aggregate queries approximately; however, the user will want to ensure that the statistical summaries (or approximations) of the data are reliable, i.e. the approximation of the data warehouse does not result in a significant error of approximation. If the errors created by approximating the database are too large, the user will be unable to accurately and efficiently analyze the data. Thus, the user seeks an approximation that is both more manageable in terms of memory space and time, while maintaining a reliable degree of accuracy of the results, i.e. minimizing the error created by approximating the database.

Figure 2:
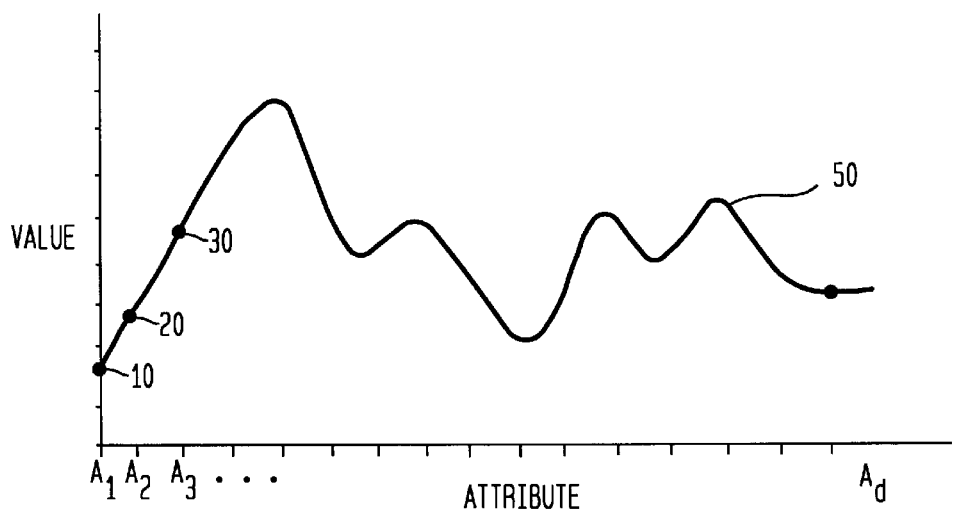
FIG. 2 illustrates a sample data distribution of a one-dimensional array database.

Suppose the data distribution of the data warehouse from above is an array A which consists of attribute values $A_1, A_2, \ldots A_d$, where the domain value of each attribute is totally ordered (e.g., the attributes are numeric as sales transactions, or character strings as in Employee names, etc.). As shown in FIG. 2, a data distribution comprises a plurality of data points 10, 20, 30 which indicate a value of an attribute $A_1$, $A_2$, $A_3$. It is desired to accurately approximate the contents of the entire data distribution using only a specified amount of memory space B, where B is determined by the user, within a reasonable amount of time.

The general process 100 of approximating the database as shown in FIG. 2 comprises partitioning this data distribution using the budget of at most B memory locations as determined by the user (Step 110). To do so, array A is partitioned into non-overlapping regions $R_1, \ldots, R_k$, for some k, together with individual budget assignments $B_1, \ldots, B_k$ such that $\Sigma_i B_i \leq B$.

Figure 4:
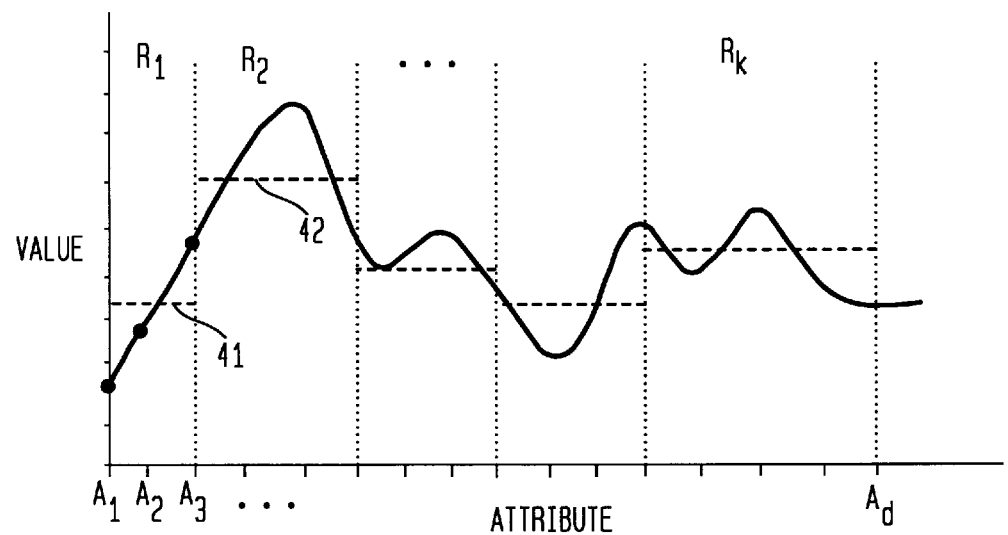
FIG. 4 illustrates an example of an approximation of each region created by partitioning.

Each region $R_i$ is then approximated (Step 120) by any technique known in the art, but using no more than its allotted budget $B_i$ of memory space. For example, region $R_i$ may be approximated using only the average of the values in that region as illustrated in FIG. 4; this takes only one memory space per region. As shown in FIG. 4, the average of the values of each region R are indicated by dashed lines 41, 42. Another example is when $R_i$ is approximated using a linear equation. Since any line can be specified by at most two parameters (y=ax+b), this uses at most two memory locations per region. Other approximation techniques may also be used as are generally known in the art.

Each region $R_i$ is itself a d-dimensional array. For example, in the case when A is one-dimensional, the database consists only of records with a single attribute. A will then be partitioned into regions which in this case are non-overlapping linear sub-arrays. If A is a two-dimensional array, the regions would be two-dimensional sub-arrays.

Figure 5:
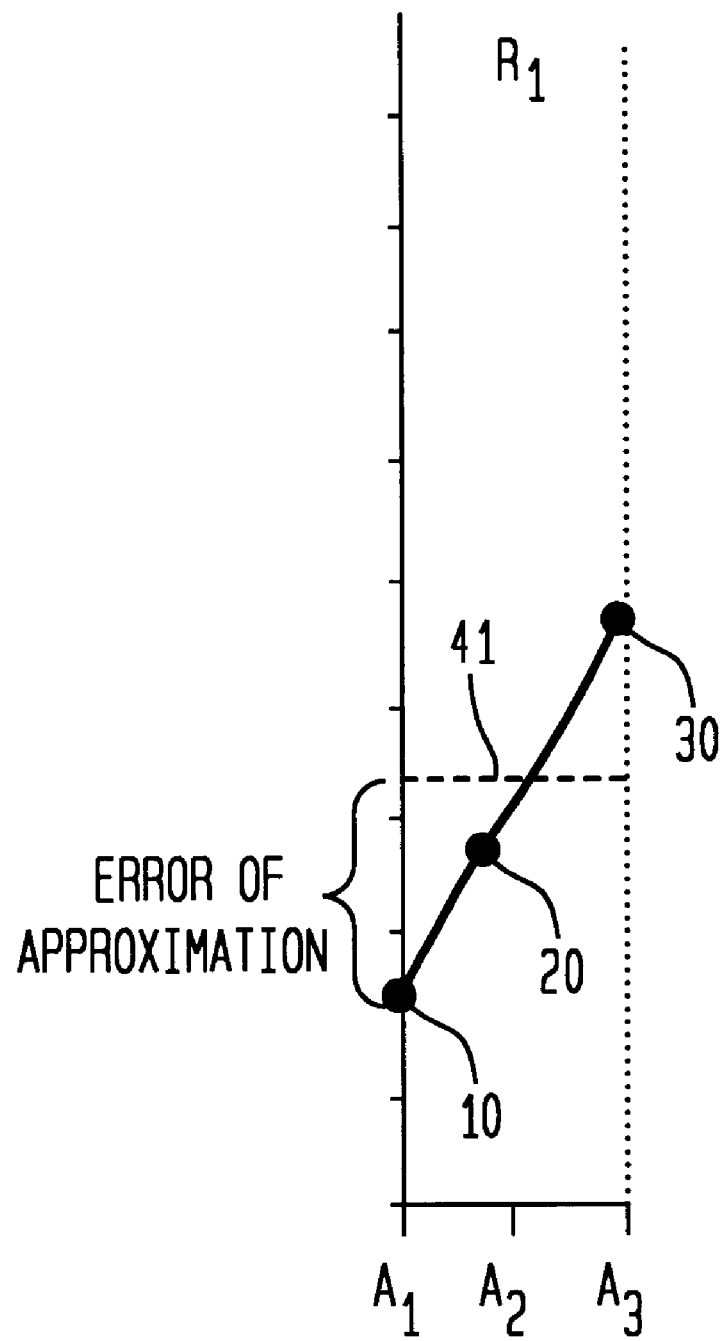
FIG. 5 illustrates an example of a single region created by partitioning.

Any such approximation (Step 120) of a region results in some error between the actual data points of the region and the approximation of the region. FIG. 5 illustrates generally a close-up view of region $R_1$ from FIG. 4. The error of approximation for attribute $A_1$ is the value of the difference between data point 10 and the average value of the entire region $R_1$ indicated by dashed line 41. The error of approximation for each data point in a region is similarly calculated.

There are many different reasonable measures of the error of such an approximation. Some standard error metrics for measuring the error in approximating a distribution are:

(1) MAX: the maximum absolute error in estimating any point,
(2) SSE: the sum of the squares of the absolute errors in estimating points,
(3) RAT: the maximum relative error (in percent) in estimating any point, or
(4) ENT: the entropy of the error distribution.

In the general process 100 of the present invention, each region is separately approximated (Step 120 of FIG. 1) by some technique. This results in an approximation error inside that region that is defined with respect to some metric error.

The errors of the regions measured in this metric when combined (Step 130) using a norm determines the total error for the entire distribution.

Some examples of norms are:

1. $L_1$: the sum of the errors in all regions,
2. $L_\infty$: the maximum error of any region, and
3. $W_1$: the weighted sum of the errors of individual regions (the weight of a region might be the probability of accessing that region for query processing, or its geometric parameters such as its area, or its average element, etc.).

The choice of the error metric together with the norm gives the optimization criterion for approximating a data distribution of a database utilizing the general process 100 of the invention. In step 140, an approximation of the entire input domain, i.e. the entire data distribution, is produced and stored.

In most applications, it is desirable to get an optimized approximation of the entire distribution with respect to a particular error metric, such as MAX or SSE, because it is particularly useful for the purpose. Thus, in order to employ this metric, this metric must be represented as a combination of an error metric for the entire atomic region and an appropriate norm. This leads to the concept of a "decomposable" error metric defined as a metric with the property that the error for the entire distribution can be obtained by computing the error inside each atomic region using the same metric, and then combining the results of the atomic regions using some appropriate norm.

For example, suppose the MAX metric is adopted for the error in approximating the entire distribution. This norm can be represented in the inventive framework by applying MAX inside each atomic region and applying the $L_\infty$ norm to combine the errors over the atomic regions.

Figure 3:
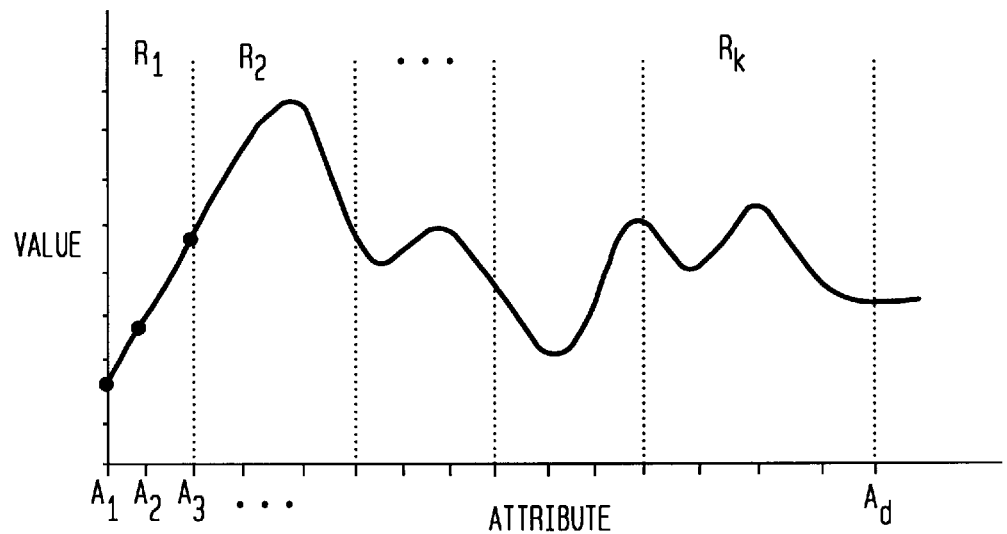
FIG. 3 illustrates an example of partitioning the data distribution into buckets.

Within the general process 100, any given distribution can be approximated with minimal error for many different optimization criteria and any technique for approximating the regions. The method is based on single- and multi-dimensional dynamic programming techniques. The One-Dimensional Case Assume a one-dimensional array A corresponding to a single-attribute distribution as shown in FIG. 2. A region can be any interval A[i,j]. Thus, region $R_1$ of FIG. 3, which comprises the interval between $A_1$ and $A_3$, is the interval A[1,3]. Throughout the one-dimensional case, a single norm, namely $L_1$, will be focused on; however, other norms can be handled similarly.

The one-dimensional (1D) partitioning problem can be stated as thus: Given an array A of size n and an integer budget B, the problem is to partition A into intervals $I_1$, $I_2, \ldots, I_k$, for some k, together with individual budgets $B_1$, $B_2, \ldots, B_k$, such that the total error E, where $$E = \sum_{1 \leq i \leq k} E(I_i, B_i)$$

is minimized and $\Sigma_{1 \leq i \leq k} B_i \leq B$.

Here, $E(I_i, B_i)$ is the minimum error in any metric of choice, such as MAX, SSE, RAT or ENT as previously defined, using any combining technique of choice, such as $L_1$, $L_\infty$, or $W_1$ as previously defined for approximating the interval $I_i$ with at most $B_i$ space. The time taken to calculate $E(I_i, B_i)$ depends on the technique and the metric used. For generality, instead of assuming a specific technique or metric, it can be assumed that calculating $E(I_i, B_i)$ takes time $T(I_i, B_i)$ for any interval $I_i$ and memory budget $B_i$, and $$\max T(I_i, B_i) \leq T.$$

An efficient method to solve the one-dimensional $L_1$ partitioning problem is as follows. $E^*(i,K)$ is defined to be the minimum total error for the prefix A[1,i] using at most K memory space. Then, $$E^*(i, K) = \min_{1 \leq j < i, 1 \leq K' \leq K-1} \{E^*(j, K') + E([j+1, i], K - K')\}.$$

$E^*$ is defined to be the minimum total error for the entire array A. Thus, $E^* = E(n, B)$. In order to calculate $E^*$, the dynamic programming technique is used to calculate $E^*(i, K)$ for all $1 \leq i \leq n$ and $1 \leq K \leq B$. $E^*(i,K)$ is computed in increasing order K, and for any fixed K, in increasing order of i. The vales of $E^*(i,K)$ are tabulated as they are calculated. When $E^*(i,K)$ is calculated, any $E^*(j,K')$ that is needed will already be in the table and can be retrieved by a table lookup.

Time complexity, i.e. the way in which the number of steps required by an algorithm varies with the size of the problem it is solving, is normally expressed as an order of magnitude O( ), and therefore, a time complexity of $O(N^2)$ means that if the size of the problem (N) doubles then the algorithm will take four times as many steps to complete. In the above example, there is a total of O(nB) calculations of values $E^*(i,K)$, and each involves O(nB) terms, where each term requires a table lookup for $E^*(j,K')$, and a call to find E([j+1,i],K-K') taking at most time T. Thus, the optimal solution to the 1D-$L_1$ partitioning problem can be found in $O(n^2B^2T)$ time for any technique and metric that can approximate the data distribution in an interval within time T.

As with all dynamic programming routines, the method can be easily modified to identify the intervals and their associated budgets in the solution with the optimum value.
Application to Selectivity Estimation using Histograms Histograms approximate the data distribution of an attribute by grouping values into regions or subsets (called buckets) and using the summary statistics of the values in the buckets. The general process 100 of the present invention can be used to construct V-Optimal histograms in a reduced amount of time from previous methods. A V-Optimal histogram is the most accurate histogram that can be calculated. In a similar manner, the general results lead to an efficient method for constructing the optimal Spline-based histogram. See Viswanath Poosala, "Histogram-based Estimation Techniques in Databases," Ph.D. Thesis, University of Wisconsin-Madison, 1997, for the definition of a Spline-based histogram.

The general process 100 of the present invention can be used to construct a V-Optimal histogram. The technique used to approximate the data distribution in each region (Box 120 of FIG. 1) is to store the average of the values in that region. The error metric in each region is SSE as previously defined. The norm for composing the errors of the regions is $L_1$ as previously defined.

One-Dimensional V-Optimal Histograms

FIG. 6 shows the general steps 200 in finding the minimum total error of a V-Optimal histogram using at most B buckets in time $O(n^2B)$ according to the present invention.

Assume an array A of size n in which the regions are intervals as before, and the error metric for a region $I_i$ is the sum of the squares of the absolute errors in estimating the points, $SSE(I_i)$. Partitioning A to optimize the $L_1$ norm (sum of errors in all regions) of the SSE metric for the regions is precisely the problem of constructing a 1D V-Optimal histogram.

The computation time of the 1D V-Optimal histogram can be reduced in accordance with the method of the present invention.

The error metric SSE(a,b) for any interval [a,b] on the array A can be computed very efficiently. To do this, array A is preprocessed to compute arrays P[1,n] and PP[1,n], where $P[i]=\Sigma_{j \leq i} A[j]$ and $PP[i]=\Sigma_{j \leq i} A[j]^2$ as shown in step 210. This takes O(n) time. Now the error metric SSE(i,j) for any interval [i,j] can be rewritten as $$SSE(i, j) = \sum_{i \leq k \leq j} (A[k] - \overline{A[i, j]})^2$$

$$= \sum_{i \leq k \leq j} A[k]^2 + (j - i + 1)\overline{A[i, j]}^2 - 2\overline{A[i, j]} \sum_{i \leq k \leq j} A[k]$$

$$= \sum_{i \leq k \leq j} A[k]^2 - (j - i + 1)\overline{A[i, j]}^2.$$

Note that $$\sum_{i \leq k \leq j} A[k] = P[j] - P[i - 1] \text{ and}$$

$$\sum_{i \leq k \leq j} A[k]^2 = PP[j] - PP[i - 1].$$

In V-Optimal histograms, since each bucket only stores a single value and therefore uses a single memory location, the recursion can be rewritten as:

$$SSE^*(i, K) = \min_{1 \leq j < i} \{SSE^*(j, K - 1) + SSE([j + 1, i], 1)\}.$$

In step 220, SSE*(i,K) is calculated. SSE*(i,K) is calculated in increasing order of K, and for any fixed K, in increasing order of i.

In step 230, the values of SSE*(i,K) are stored in a memory location as they are tabulated. When SSE*(i,K) is calculated, any SSE*(j,K') that is needed will already be in the table and can be retrieved by a table lookup.

In step 240, the method returns SSE*(n,B) as the total minimum error for the V-Optimal histogram utilizing at most B buckets. As with all dynamic programming routines, the method can be easily modified to identify the intervals and their associated budgets in the solution with the optimum value.

Since calculating each term in the recursive expression for SSE(i,j) requires O(n) time, and there are O(n,B) terms in all, the V-Optimal histogram can be computed in $O(n^2B)$ time utilizing the present method.

The method for 1D histograms described above is already quite efficient and can compute large histograms on thousands of data points and hundreds of buckets in a matter of minutes.

A further improvement provides an additional technique that can provide another significant reduction in the running time on most input data.

Consider an implementation of the V-Optimal algorithm as described in reference to FIG. 6. In this implementation, the entries SSE*(i,k) are computed in step 220 in increasing order of the number of buckets K, and for each K, the entries are computed in order of increasing i.

Now consider the computation of SSE*(i,K), noting that all entries SSE*(i',K') with i'<i and K'<K have already been computed. The V-optimal algorithm now computes $$SSE^*(i, K) = \min_{1 \leq j \leq i - K} \{SSE^*(i - j, K - 1) + SSE([i - j + 1], 1)\}$$

by iterating j from 1 to i−K. As j increases, SSE([i−j+1, i],1) monotonically increases. Thus, as soon as a $j_0$ is arrived at such that SSE([i−$j_0$+1, i],1)>$S_0$, where $S_0$ is the minimum solution found thus far, the search can be stopped as all other entries will lead to an error larger than the minimum.

This termination condition results in a performance improvement. However, this process can be taken further. Assume that $S_0$ is some initial value that provides an upper bound for SSE*(i,K), which can be obtained by computing a few iterations of j. A binary search can be used to find $j_0$, the minimum j such that SSE([i−j+1,i],1)>$S_0$ and as before conclude that the optimum solution is obtained by some j<$j_0$.

Now SSE*(i−j,K−1) monotonically decreases as j increases. Thus, SSE*(i−$j_0$,K−1) is a lower bound for any SSE*(i−j,K−1) with j<$j_0$. $S_1$ is now defined as $S_1$=$S_0$−SSE*(i−$j_0$,K−1), and another binary search is performed that finds $j_1$, the minimum j such that SSE([i−j+1,i],1)>$S_1$, and conclude that the minimum solution is obtained by some j<$j_1$. In general, $S_m$ is defined as $S_m$=$S_0$−SSE*(i−$j_{m-1}$,K−1)

and repeat the process until $j_m$=$j_{m-1}$. This $j_m$ is used as the upper limit for j in the innermost loop, and the optimum solution is computed.

Referring now to FIG. 7, in a preferred embodiment, the data distribution approximation method of the present invention is performed on a programmed general-purpose computer system 340. The computer system 340 includes a central processing unit (CPU) 344 that communicates to an input/output (I/O) device 342 over a bus 352. A second I/O device 346 is illustrated, but is not necessary to practice the method of the present invention. The computer system 340 also includes random access memory (RAM) 348, read only memory (ROM) 350, and may include peripheral devices such as a floppy disk drive 354 and a compact disk (CD) ROM drive 356 which also communicate with CPU 344 over the bus 352. It must be noted that the exact architecture of the computer system 340 is not important and that any combination of computer compatible devices may be incorporated into the system 340 as long as the method of the present invention can operate on a system 340 having a CPU 344, RAM 348 and storage memory as described below. Moreover, the program for CPU 344 which causes it to implement the invention may be stored in ROM 350, CD-ROM 360, floppy disk 358, a hard drive or any other medium capable of storing a program. During execution of the program it will be loaded into RAM 348. All of these devices communicate with CPU 344 as is well known in the art.

The CPU 344 performs the logical and mathematical operations required by the method of the present invention, such as data manipulation, as well as other arithmetic and logical functions generally understood by those of ordinary skill in the art. The RAM 348 is used to store the data to be approximated and program instructions required to implement the inventive method and can be comprised of conventional random access memory (RAM), bulk storage memory, or a combination of both as generally understood by those of ordinary skill in the art. The I/O device 342 is responsible for interfacing with an operator of the computer system 340 or with peripheral data devices such as a hard drive or other device (not shown) to receive or distribute data as generally understood by those of ordinary skill in the art.

The present invention has provided a method for approximating data distributions. The method involves partitioning the data domain into regions and applying any known technique to approximate the regions, and composing the error metric in approximating the data within each region using some norm. Efficient methods to determine partitioning schemes that provably optimize these norms irrespective of the technique applied in the regions have also been provided. An application of these techniques is to compute the V-Optimal histogram. The present invention presents an accelerated method to do so.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A computer based method for producing a representation of a distribution of data stored as a set of data points in a computer database, said representation comprising fewer data points than said data distribution in said database to allow a user to more efficiently analyze said database, said method comprising the steps of:
   a) partitioning said data distribution within said database into a plurality of regions, wherein a maximum number of said plurality of regions is specified by said user;
   b) producing for each of said regions a new set of data which approximates the data contents of each of said regions, said new set of data having less data points than that of the data points present in each of said regions, said approximation resulting in an error of approximation for each of said plurality of regions;
   c) combining said error of approximation for each of said plurality of regions using a norm to produce an approximation with a total error of said data distribution;
   d) repeating steps (a) through (c) until a minimum value of said total error is determined for said maximum number of said plurality of regions as specified by said user; and
   e) storing said produced approximation which is associated with said minimum value of said total error of said data distribution.

2. The method according to claim 1, wherein said computer database contains a multi-dimensional array of data points forming said data distribution.

3. The method according to claim 2, wherein said plurality of regions are multi-dimensional arrays.

4. The method according to claim 1, wherein said producing step results in an approximate error inside each of said plurality of regions that is defined with respect to an error metric.

5. The method according to claim 4, wherein said error metric is a maximum absolute error in estimating any point.

6. The method according to claim 4, wherein said approximate error inside each of said plurality of regions is an absolute error in estimating each data point.

7. The method according to claim 6, wherein said absolute error in estimating each data point is squared, and said error metric is a sum of said squares of said absolute error in estimating each data point.

8. The method according to claim 4, wherein said error metric is a maximum relative error in percent in estimating any point.

9. The method according to claim 4, wherein said producing step results in an error distribution, and said error metric is an entropy of said error distribution.

10. The method according to claim 4, wherein said error metric is a decomposable error metric.

11. The method according to claim 1, wherein said combining step further comprises:
   determining a total error for said data distribution.

12. The method according to claim 1, wherein said norm is a sum of said error of approximation for said plurality of regions.

13. The method according to claim 1, wherein said norm is a maximum error of any of said plurality of regions.

14. The method according to claim 1, wherein said norm is a weighted sum of said error of approximation of each of said plurality of regions.

15. The method according to claim 1 further comprising:
   using said stored produced approximation of said data distribution to provide answers to user input data queries.

16. A computer based method for producing a representation of a distribution of data stored as a set of data points in a computer database, said representation comprising fewer data points than said distribution in said database to allow a user to more efficiently analyze said database, said method comprising the steps of:
   a) partitioning said data distribution within said database into a plurality of regions, wherein a maximum number of said plurality of regions is specified by said user;
   b) producing for each of said regions a new set of data which approximates the data contents of each of said regions, said new set of data having less data points than that of the data points present in each of said regions, said approximation resulting in an error of approximation for each of said plurality of regions;

c) combining said error of approximation for each of said plurality of regions using a norm to produce an approximation with a total error of said data distribution;

d) repeating steps (a) through (c) until a minimum value of said total error is determined for said maximum number of said plurality of regions as specified by said user;

e) storing said produced approximation which is associated with said minimum value of said total error of said data distribution; and f) using said stored produced approximation to construct a histogram of said database.

17. The method according to claim 16, wherein said histogram is a V-Optimal histogram.

18. The method according to claim 16, wherein said histogram is a Spline-based histogram.

19. The method according to claim 16, wherein said producing step results in an error of approximation for each of said regions that is defined with respect to an error metric.

20. The method according to claim 19, wherein said error of approximation is an absolute error in estimating each data point.

21. The method according to claim 20, wherein said absolute error in estimating each data point is squared, and said error metric is computed as a sum of said squares of said absolute error in estimating each data point.

22. The method according to claim 21, wherein said error metric is computed in increasing order for each of said regions.

23. The method according to claim 22, wherein said error metric is further computed in increasing order of each of said data points within each of said regions.

24. The method according to claim 21, wherein said error metric computation is terminated when a minimum value is determined.

25. The method according to claim 16, wherein said norm is a sum of said errors of approximation for each of said regions.

26. The method according to claim 16 further comprising: using said histogram of said database to provide answers to user input data queries.

27. A computer readable storage medium containing a computer readable code for operating a computer to perform a method for producing a representation of a distribution of data stored as data points in a computer database, said representation comprising fewer data points than said data distribution in said database to allow a user to more efficiently analyze said database, said method comprising the steps of:

a) partitioning said data distribution within said database into a plurality of regions, wherein a maximum number of said plurality of regions is specified by said user;

b) producing for each of said regions a new set of data which approximates the data contents of each of said regions, said new set of data having less data points than that of the data points present in each of said regions, said approximation resulting in an error of approximation for each of said plurality of regions;

c) combining said error of approximation for each of said plurality of regions using a norm to produce an approximation with a total error of said data distribution;

d) repeating steps (a) through (c) until a minimum value of said total error is determined for said maximum number of said plurality of regions as specified by said user; and e) storing said produced approximation which is associated with said minimum value of said total error of said data distribution.

28. The computer readable storage medium according to claim 27, wherein said computer database contains a multi-dimensional array of data points forming said data distribution.

29. The computer readable storage medium according to claim 28, wherein said plurality of regions are multi-dimensional arrays.

30. The computer readable storage medium according to claim 27, wherein said producing step results in an approximate error inside each of said plurality of regions that is defined with respect to an error metric.

31. The computer readable storage medium according to claim 30, wherein said error metric is a maximum absolute error in estimating any point.

32. The computer readable storage medium according to claim 30, wherein said approximate error inside each of said plurality of regions is an absolute error in estimating each data point.

33. The computer readable storage medium according to claim 32, wherein said absolute error in estimating each data point is squared, and said error metric is a sum of said squares of said absolute error in estimating each data point.

34. The computer readable storage medium according to claim 30, wherein said error metric is a maximum relative error in percent in estimating any point.

35. The computer readable storage medium according to claim 30, wherein said producing step results in an error distribution, and said error metric is an entropy of said error distribution.

36. The computer readable storage medium according to claim 27, wherein said combining step further comprises: determining a total error for said data distribution.

37. The computer readable storage medium according to claim 27, wherein said norm is a sum of said error of approximation for said plurality of regions.

38. The computer readable storage medium according to claim 27, wherein said norm is a maximum error of any of said plurality of regions.

39. The computer readable storage medium according to claim 27, wherein said norm is a weighted sum of said error of approximation of each of said plurality of regions.

40. The computer readable storage medium according to claim 30, wherein said error metric is a decomposable error metric.

41. The computer readable storage medium according to claim 27, wherein said stored produced approximation of said data distribution is used to provide answers to user input data queries.

42. A programmed computer database approximating system, said system comprising:

a computer operating a program, said program comprising:

means for partitioning a data distribution within a computer database stored on a computer readable medium into a plurality of regions wherein a maximum number of said regions is specified by a user, said computer database including a set of data points;

means for producing for each of said regions a new set of data which approximates the data in each of said regions, said new set of data having less data points than that of the data points in each of said regions, said approximation resulting in an error of approximation for each of said regions;

means for combining said error of approximation for each of said plurality of regions using a norm to produce an approximation with a total error of said data distribution;

means for determining when a minimum value for said total error is produced for said maximum number of regions as specified by said user; and means for storing said produced approximation of said data distribution which is associated with said minimum total error.

43. The programmed computer database approximating system according to claim 42, wherein said means for producing results in an approximate error inside each of said plurality of regions that is defined with respect to an error metric.

44. The programmed computer database approximating system according to claim 43, wherein said error metric is a maximum absolute error in estimating any point.

45. The programmed computer database approximating system according to claim 43, wherein said approximate error inside each of said plurality of regions is an absolute error in estimating each data point.

46. The programmed computer database approximating system according to claim 45, wherein said absolute error in estimating each data point is squared, and said error metric is a sum of said squares of said absolute error in estimating each data point.

47. The programmed computer database approximating system according to claim 43, wherein said error metric is a maximum relative error in percent in estimating any point.

48. The programmed computer database approximating system according to claim 43, wherein said means for producing results in an error distribution, and said error metric is an entropy of said error distribution.

49. The programmed computer database approximating system according to claim 43, wherein said error metric is a decomposable error metric.

50. The programmed computer database approximating system according to claim 42, wherein said means for combining further comprises:

means for determining a total error for said data distribution.

51. The programmed computer database approximating system according to claim 42, wherein said norm is a sum of said error of approximation for said plurality of regions.

52. The programmed computer database approximating system according to claim 42, wherein said norm is a maximum error of any of said plurality of regions.

53. The programmed computer database approximating system according to claim 42, wherein said norm is a weighted sum of said error of approximation of each of said plurality of regions.

54. The programmed computer database approximating system according to claim 42 wherein said program further comprises:

means for using said stored produced approximation of said data distribution to provide answers to user input data queries.

* * * * *